United States Patent [19]

Vasselet

[11] Patent Number: 5,036,666
[45] Date of Patent: Aug. 6, 1991

[54] STABLE POSITION BLEED VALVE WITH O-RING DETENT

[75] Inventor: Joel Vasselet, Chelles, France

[73] Assignee: Bendix Europe Services Techniques, Drancy, France

[21] Appl. No.: 469,129

[22] Filed: Jan. 24, 1990

[30] Foreign Application Priority Data

Jan. 20, 1989 [FR] France ................. 89 00653

[51] Int. Cl.[5] .............. B60T 15/48; F16K 15/18; F16K 15/04
[52] U.S. Cl. .................. 60/584; 137/461; 251/297; 188/352
[58] Field of Search ........ 60/584, 591; 92/26; 137/461; 251/297; 188/352

[56] References Cited

U.S. PATENT DOCUMENTS

| | | | |
|---|---|---|---|
| 2,996,046 | 8/1961 | Skopp et al. | 92/26 X |
| 3,072,149 | 1/1963 | Hasbany | 137/625.69 X |
| 3,166,990 | 1/1965 | Hoffman | 92/30 X |
| 3,434,493 | 3/1969 | Owens | 137/460 X |
| 3,789,611 | 2/1974 | Marquardt | 188/359 X |
| 4,116,004 | 9/1978 | Geary | 60/584 X |
| 4,257,315 | 3/1981 | Tisell et al. | 92/26 |
| 4,831,826 | 5/1989 | Belart et al. | 60/545 |
| 4,902,077 | 2/1990 | Belart et al. | 188/352 X |

FOREIGN PATENT DOCUMENTS 2751794 5/1979 Fed. Rep. of Germany .
1105832 3/1968 United Kingdom .

Primary Examiner—Edward K. Look
Assistant Examiner—George Kapsalas
Attorney, Agent, or Firm—Larry J. Palguta; Ken C. Decker

[57] ABSTRACT

The bleed valve (22) especially for a hydraulic brake circuit, comprises a fluid reservoir (20), a hydraulic motor (26) and a mechanism for putting the fluid under pressure (24), and has a first port (42) connected to the motor (26) and to the mechanism (24) by way of a first conduit (62) and a second port (54) connected by way of a second conduit (60) to the reservoir (20) which is likewise connected to the inlet of the mechanism (24) by way of a third conduit (64), the first and second conduits (60,62) communicating with one another by way of the valve (22) during the initial bleeding phase of the hydraulic circuit, and no longer communicating from the moment when the fluid is first put under pressure. The valve (22) comprises a piston (36) capable of sliding in a bore (32,34) and keeping the shutter (44,42) of the valve open during the bleeding phase counter to a compressed spring (46). The bore (32,34) is stepped, and a flexible annular ring (48) is arranged in an annular groove (50) formed on the periphery of the piston (36) and interacts with a slope (52) consisting of the intermediate part between the two parts of the bore (32,34), in order to keep the piston in the stable initial position as long as the pressure of the fluid in the hydraulic circuit is below a specific threshold.

1 Claim, 1 Drawing Sheet

STABLE POSITION BLEED VALVE WITH O-RING DETENT

BACKGROUND OF THE INVENTION

The present invention relates to hydraulic devices comprising a piston sliding in a bore and capable of assuming at least one stable position, as long as the force exerted on the piston is below a specific threshold, and of these, more particularly a bleed valve especially for a hydraulic brake circuit of a motor vehicle.

These hydraulic devices of stable piston position generally have a prestressed spring bearing in the piston counter to the force exerted on it. As soon as this force exceeds the threshold determined by the prestress, the differential of the pressures generated by the two opposite forces tends to move the piston in proportion to this differential. In some uses, like that described below, it is necessary to obtain an all-or-nothing mode of operation. The subject of the present invention is, therefore, such a device which is reliable and inexpensive.

SUMMARY OF THE INVENTION

According to the invention, a flexible annular ring is arranged in an annular groove formed on the periphery of the piston and interacts with a slope defined in the bore where the piston slides, in order to keep the latter in a stable position as long as the force exerted on the piston is below a threshold determined by the flexibility of the ring and the angle of the slope. When this force is higher than this threshold, it moves the piston suddenly.

Such a device is especially useful for providing a bleed valve, such as is employed by motor-vehicle manufacturers to bleed the brake circuits before introducing the brake fluid. A bleed valve performing this bleed function is described in U.S. Pat. No. 4,902,077 (see FIG. 3 therein) according to which a first stable position is obtained solely as a result of the friction exerted by an O-ring gasket arranged between the piston and the bore in which it slides. However, it is not desirable in the art that a gasket should have a second function. Moreover, an ill-timed shock can bring the piston out of its initial stable position, as a result of which the bleeding operation is prevented, without initial manual action on the defective component.

Another subject of the present invention is, therefore, a bleed valve especially for a hydraulic brake circuit, comprising a fluid reservoir, a hydraulic motor and a mechanism for putting the fluid under pressure, the valve having a first port connected to the motor and to the mechanism by means of a first conduit and a second port connected by means of second conduit to the reservoir which is itself connected to the mechanism by means of a third conduit, the first and second conduits communicating with one another by way of the valve, during the initial bleeding phase of the hydraulic circuit, and no longer communicating from the moment when the fluid is first put under pressure, the valve comprising a piston capable of sliding in a bore and keeping the shutter of the valve open during the bleeding phase counter to a compressed spring.

According to the invention, the bore is stepped, and a flexible annular ring arranged in an annular groove formed on the periphery of the piston interacts with a slope consisting of the intermediate part between the two parts of the bore in order to keep the piston in a stable position as long as the pressure of the fluid in the hydraulic circuit is below a specific threshold.

BRIEF DESCRIPTION OF THE DRAWINGS

The invention will now be described by way of example with reference to the accompanying drawings in which.

DETAILED DESCRIPTION OF THE PREFERRED EMBODIMENT

Figure 1:
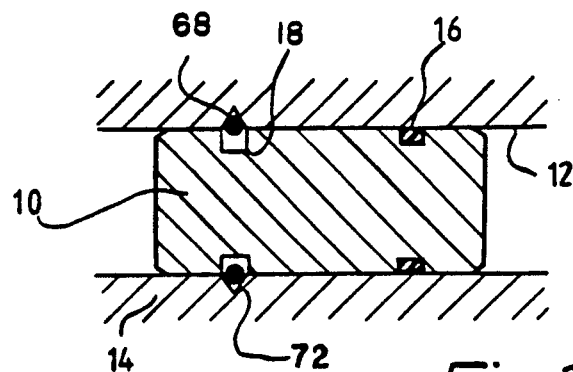
FIG. 1 shows diagrammatically a hydraulic device of stable piston position.

Referring now to FIG. 1, a piston 10 slides in a bore 12 made in a body 14. An 0-ring gasket 16 ensures, for example, sealing between the two opposite chambers of the piston. An annular groove 18 is made on the periphery of the piston 10, so as to form a receptacle for a flexible annular ring 68 when the latter is contracted. A circular notch 72 made in the bore 12 is of sufficient size to ensure that the ring 68 can penetrate into it at least partially as a result of decompression when the groove 18 and notch 72 confront one another. For this purpose, the notch has at least one slope for the ring 68 in the direction of movement of the piston.

Thus, when the groove 18 and notch 72 confront one another, the ring 68 immobilizes the piston 10, as long as the force exerted on one of the faces of the piston does not exceed a value determined by the flexibility of the ring 68 and by the angle of the slope of the notch 72. When this force exceeds this specific value, the ring 68 no longer has any effect (except additional friction, perhaps), contrary to a conventional prestressed helical spring.

Figure 2:
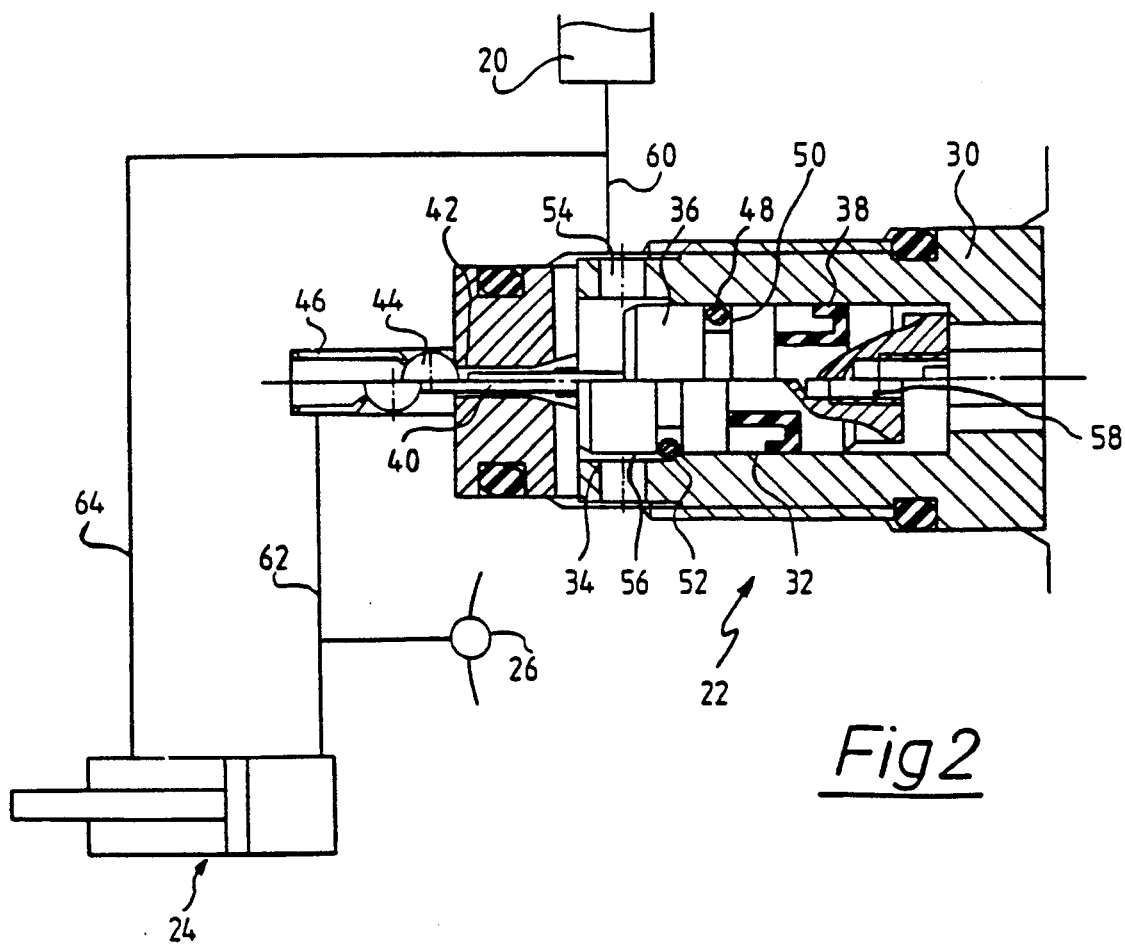
FIG. 2 shows diagrammatically a bleed valve according to the invention.

The invention is put to beneficial use in the bleed valve of the hydraulic circuit illustrated diagrammatically in FIG. 2, in which the lower half of the valve is shown in the stable state after the fluid in the circuit has been put under pressure.

This circuit comprises, in a conventional way for a brake circuit equipping motor vehicles, a brake-fluid reservoir 20 connected on the one hand; via a conduit 60, to a port of the bleed valve 22 and on the other hand, via a conduit 64, to the inlet of a pressure generator 24, for example a master cylinder, the outlet of which is connected, by means of a conduit 62, on the one hand to at least one brake motor 26 and on the other hand to a second port of the bleed valve 22.

This bleed valve 22 is provided in a body externally threaded so as to be screwed into an upper part of the circuit. This body has a stepped bore 32,34, in which a piston 36 slides sealingly by means of a sealing collar 38. The piston 36 is integral with a needle 40 entering a port 42 for the purpose of pushing a ball 44 counter to a helical spring 46, in order to open the shutter in the initial position. An annular ring 48 is arranged in an annular groove 50 made on the periphery of the piston. The slope 52 consists, here, of the intermediate part present between the two parts 32,34 of different cross-sections of the bore.

The bleed valve is therefore supplied to the manufacturer in its stable initial position, that is to say that shown in the lower part of the Figure. The ring 48 immobilizes the piston on the left in the Figure. The shutter 42,44 is open, thus ensuring communication between the conduits 60,62 by way of the ports 42,54 and of the annular chamber 56 defined between the piston 36 and the part 34 of larger cross-section of the bore where the piston 36 slides.

The manufacturer can then bleed the circuit in the conventional way from the reservoir 20 by generating a vacuum in this circuit and then introduce the brake fluid. From the moment when the pressure in the annular chamber 56 is higher than a threshold determined by the flexibility of the ring 48 and the angle of the slope 52, the piston is pushed to the right in the Figure, as shown in the upper part of the cross-section of the valve. The shutter 44,42 closes and the pressure in the circuit confirms the closing of the shutter, the ball 42 being pushed by the spring 46 and by the pressure prevailing in the conduit 62.

The bleed valve just described therefore undoubtedly has the two stable states required by the manufacturers.

Furthermore, a threaded blind bore 58 is provided at the rear of the piston, so as to make it possible and easier for a mechanic to carry out conventional bleeding, and in this way the opening and closing of the shutter can be obtained simply as a result of manual action.

An average person skilled in the art will have understood from the foregoing that the term "ring" means an open ring made, for example, of spring steel and compressed by the bore and expanded slightly when it interacts with a slope.

Although only one preferred embodiment of the invention has been described, it is clear that changes can be made to it, without departing from the scope of the invention, as defined by the accompanying claims.

What is claimed is:

1. A bleed valve especially for a hydraulic brake circuit, comprising a fluid reservoir, a hydraulic motor and a mechanism for putting the fluid under pressure, said valve having a first port connected to said motor and to said mechanism by means of a first conduit and a second port connected by means of a second conduit to said reservoir which is likewise connected to the inlet of said mechanism by means of a third conduit, said first and second conduits communicating with one another by way of said valve during the initial bleeding phase of said hydraulic circuit, and no longer communicating from the moment when said fluid is first put under pressure, said valve comprising a piston capable of sliding in a bore and keeping a shutter of said valve open during said bleeding phase counter to a compressed spring, said bore being stepped, a flexible annular ring being arranged in an annular groove formed on the periphery of said piston and interacting with a slope consisting of an intermediate part between the two parts of the stepped bore, in order to keep said piston in the stable initial position as long as the pressure of said fluid in said hydraulic circuit is below a specific threshold.

* * * * *